(12) United States Patent
Elfizy

(10) Patent No.: US 7,538,296 B2
(45) Date of Patent: May 26, 2009

(54) HIGH SPEED LASER DRILLING MACHINE AND METHOD

(75) Inventor: Amr Elfizy, Longueuil (CA)

(73) Assignee: Pratt & Whitney Canada Corp., Longueuil, Quebec (CA)

( * ) Notice: Subject to any disclaimer, the term of this patent is extended or adjusted under 35 U.S.C. 154(b) by 170 days.

(21) Appl. No.: 11/218,785

(22) Filed: Sep. 6, 2005

(65) Prior Publication Data

US 2007/0051707 A1    Mar. 8, 2007

(51) Int. Cl.
*B23K 26/38* (2006.01)
*B23K 26/08* (2006.01)

(52) U.S. Cl. .............................. 219/121.71; 219/121.7; 219/121.82

(58) Field of Classification Search ............... 219/121.7, 219/121.71, 121.82, 121.67, 121.78, 121.79
See application file for complete search history.

(56) References Cited

U.S. PATENT DOCUMENTS

| | | | |
|---|---|---|---|
| 4,855,565 A * | 8/1989 | Thomas et al. ......... | 219/121.79 |
| 4,952,789 A * | 8/1990 | Suttie .................... | 219/121.68 |
| 5,037,183 A | 8/1991 | Gagosz et al. | |
| 5,216,222 A * | 6/1993 | Masuda ................. | 219/121.78 |
| 5,223,692 A | 6/1993 | Lozier et al. | |
| 5,239,160 A * | 8/1993 | Sakura et al. .......... | 219/121.82 |
| 5,279,176 A * | 1/1994 | Tahmasebi et al. ....... | 74/490.01 |
| 5,376,061 A * | 12/1994 | Suzuki .................. | 219/121.78 |
| 5,751,585 A * | 5/1998 | Cutler et al. ................ | 700/161 |
| 5,916,462 A | 6/1999 | James et al. | |
| 6,032,361 A | 3/2000 | Makino et al. | |
| 6,034,349 A | 3/2000 | Ota | |
| 6,130,405 A * | 10/2000 | Loringer ................ | 219/121.71 |
| 6,433,303 B1 * | 8/2002 | Liu et al. ................. | 219/121.7 |
| 6,462,301 B1 * | 10/2002 | Scott et al. ............. | 219/121.67 |
| 6,541,732 B2 | 4/2003 | Hirose et al. | |
| 6,581,437 B2 * | 6/2003 | Chrystall et al. .................. | 73/7 |
| 6,648,583 B1 | 11/2003 | Roy et al. | |
| 6,649,864 B2 | 11/2003 | De Steur et al. | |
| 6,655,247 B1 | 12/2003 | Walker et al. | |
| 6,734,390 B1 | 5/2004 | Frye | |
| 6,738,691 B1 | 5/2004 | Colgate et al. | |
| 6,769,194 B2 | 8/2004 | Hennessey | |
| 6,808,344 B2 | 10/2004 | Chen | |
| 6,858,814 B2 * | 2/2005 | Fischer et al. .......... | 219/121.67 |
| 7,062,845 B2 * | 6/2006 | Burgess ................. | 219/121.78 |
| 7,105,956 B2 * | 9/2006 | Botos et al. ............ | 219/121.67 |
| 2002/0149136 A1 * | 10/2002 | Baird et al. ............ | 219/121.67 |
| 2004/0126198 A1 | 7/2004 | Chen | |
| 2004/0164060 A1 * | 8/2004 | Maeda et al. .......... | 219/121.71 |
| 2004/0194569 A1 | 10/2004 | Hermoso | |
| 2004/0255696 A1 | 12/2004 | Helmer et al. | |

FOREIGN PATENT DOCUMENTS

EP        0 339 888        11/1989

(Continued)

*Primary Examiner*—Geoffrey S Evans
(74) *Attorney, Agent, or Firm*—Ogilvy Renault LLP

(57) ABSTRACT

A method of laser drillings a series of holes at spaced-apart hole locations in a workpiece comprising continually delivering laser pulses to the workpiece, and positioning the workpiece relative to the laser head from one hole location to a next hole location within a time between two consecutive pulses by moving both the laser head and the workpiece. The positioning includes synchronizing on an ongoing basis the workpiece with the pulse frequency.

23 Claims, 3 Drawing Sheets

FOREIGN PATENT DOCUMENTS

| | | | | |
|---|---|---|---|---|
| EP | 0 486 133 | | | 5/1992 |
| JP | 7-32183 | A | * | 2/1995 |
| JP | 10-137960 | A | * | 5/1998 |
| JP | 2004-216430 | A | * | 8/2004 |
| JP | 2005-88045 | A | * | 4/2005 |
| JP | 2005-169481 | A | * | 6/2005 |
| WO | WO 00/15383 | | | 3/2000 |

* cited by examiner

HIGH SPEED LASER DRILLING MACHINE AND METHOD

TECHNICAL FIELD

The invention relates generally to drilling machines and, more particularly, to an improved high speed laser drilling machine and method.

BACKGROUND OF THE ART

Providing cooling holes in combustion chamber liners and shield heat liners of gas turbine engines usually requires drilling hundreds of holes with variable inclination angles. Known processes of drilling such holes include the use of a pulsed laser in a drilling machine having five degrees of freedom where the worktable receiving the workpiece and the laser head are driven by ball screws. Generally, the table is translated along and rotated about perpendicular horizontal axes (x,y) and the laser head is translated along a vertical axis (z).

The limited capabilities of the feed drives and the dynamic constraints due to the high moving mass and inertia of such a drilling machine limits the linear and angular accelerations of the relative movement between the laser head and the worktable. Thus, the positioning between two consecutive holes on the workpiece usually takes more time than the time between two pulsations of the pulsed laser. Accordingly, the laser shutter must be closed and opened each time the machine moves from one hole to the next As a result, a major part of the cycle time between consecutive holes is spent in positioning the worktable and/or laser head and opening/closing the laser shutter, which largely increases the duration of the drilling process.

Accordingly, there is a need to provide an improved high speed laser drilling machine and method.

SUMMARY OF THE INVENTION

It is therefore an object of this invention to provide an improved high speed laser drilling machine and method.

In one aspect, the present invention provides a method of laser drilling a series of holes at spaced-apart hole locations in a workpiece, comprising the steps of continually delivering laser pulses at a given laser pulsed frequency from a laser head to the workpiece while keeping a shutter of the laser head open, and positioning the workpiece relative to the laser head from one hole location to a next hole location within a time between two consecutive pulses by moving both the laser head and the workpiece.

In another aspect, the present invention provides a method for laser drilling a plurality of holes into a workpiece, the method comprising: producing laser pulses at a given frequency with a laser head; successively moving at least one of the workpiece and the laser head to a series of relative positions with at least one of a variable speed and an irregular pattern, a time necessary to move between consecutive ones of the relative positions being at most equal to a time between two consecutive ones of the laser pulses; drilling a hole in the workpiece at each one of the series of relative positions with at least one of the laser pulses.

In another aspect, the present invention provides a method for laser drilling a plurality of holes into a workpiece, the method comprising: producing a pulsed laser beam with a laser head, the pulsed laser beam having a given pulse frequency, successively aligning each of a plurality of desired hole locations with the pulsed laser beam through relative movement between the workpiece and the laser head, one of the workpiece and the laser head being rotated about two different axes of rotation; and drilling a hole at each of the desired hole locations by coordinating the relative movement with the laser pulse frequency.

In another aspect, the present invention provides a high speed laser drilling machine for drilling a hole in each of a plurality of desired holes locations of a workpiece, the high speed drilling machine comprising: a laser head producing laser pulses in a constant manner; a worktable adapted to retain the workpiece; means for moving at least one of the worktable and the laser head to produce a relative movement between the worktable and the laser head along five degrees of freedom, the means for moving successively aligning the laser head with each of the hole locations at a desired hole angle during a time between successive laser pulses; and means for controlling the means for moving to coordinate the relative movement with the laser pulses so that the laser pulses drill a hole in the workpiece at each of the hole locations at the desired hole angle.

In another aspect, the present invention provides a high speed drilling machine comprising for drilling a plurality of holes in a workpiece, the high speed drilling machine comprising: a worktable adapted to receive the workpiece; a fixed base and a body extending therefrom; at least three legs connecting the worktable to the fixed base, each of the legs having a high speed linear actuator such as to have a variable length, the legs moving the worktable along at least three degrees of freedom; a laser head connected to the body and producing laser pulses in a constant manner to drill a plurality of holes in the workpiece.

In another aspect, the present invention provides a high speed drilling machine for drilling a plurality of holes in a workpiece, the high speed drilling machine comprising: a fixed base and a body extending therefrom; a worktable connected to the fixed base and adapted to receive the workpiece; a first laser portion connected to the body through at least a first high speed linear actuator to be translatable along at least a first direction; a second laser portion connected to the first laser portion through a first high angular acceleration rotational drive to be rotatable about a first axis; a laser head connected to the second laser portion through a second high angular acceleration rotational drive to be rotatable about a second axis, the laser head producing laser pulses in a constant manner to drill a plurality of holes in the workpiece.

Further details of these and other aspects of the present invention will be apparent from the detailed description and figures included below.

DESCRIPTION OF THE DRAWINGS

Reference is now made to the accompanying figures depicting aspects of the present invention, in which.

DETAILED DESCRIPTION OF THE PREFERRED EMBODIMENTS

Figure 1:
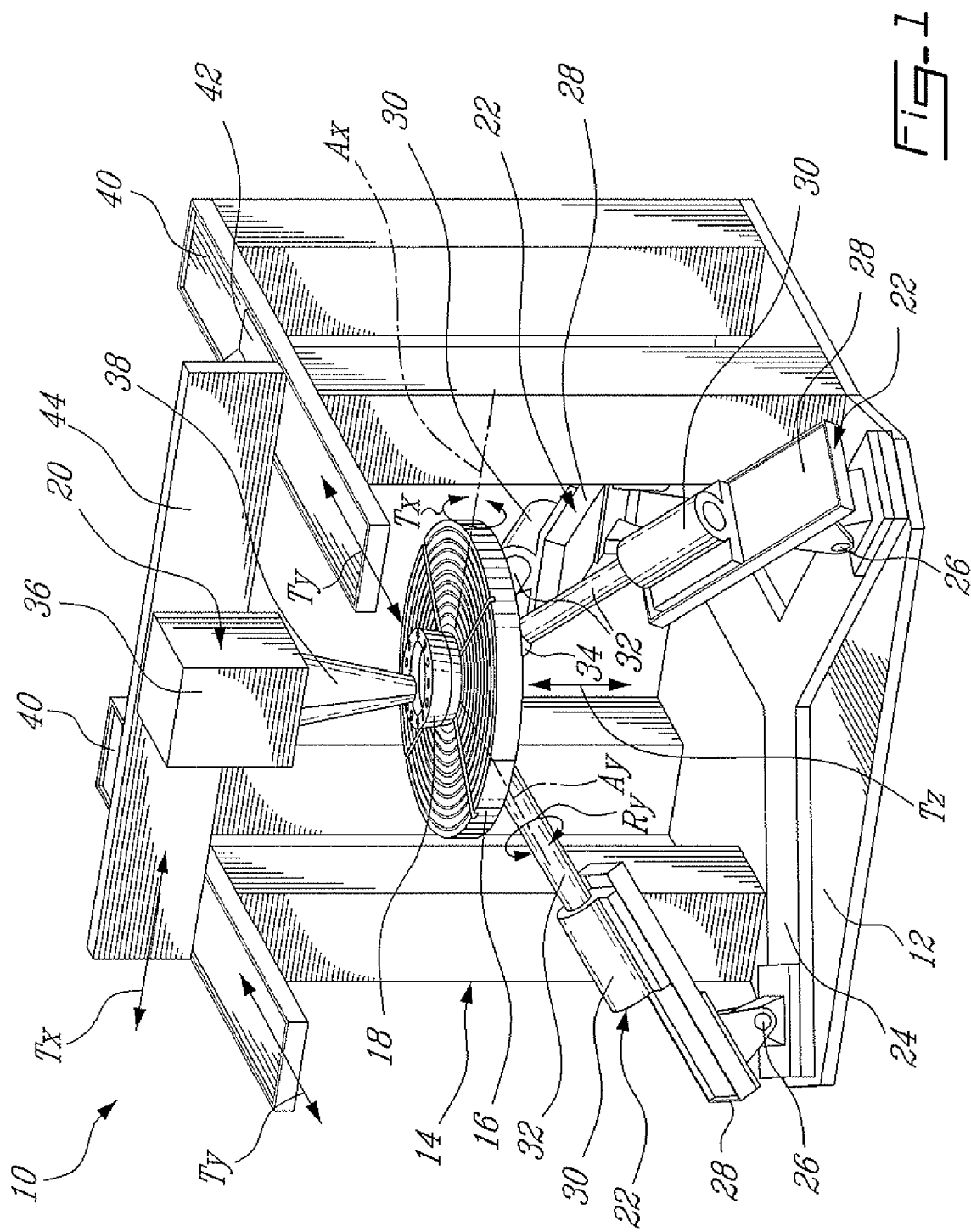
FIG. 1 is a perspective view of a drilling machine according to an embodiment of the present invention.

FIG. 1 illustrates a high speed drilling machine 10 including a fixed base 12, a body 14 supported thereon, a low inertia circular worktable 16 movably connected to the base 12 and receiving a workpiece 18, and a laser assembly 20 movably connected to the body 14 and located above the worktable 16. Throughout this specification, the term "laser assembly" and other related terms are intended also to encompass other drilling or machining processes using a pulsing medium. Similarly, the term "drilling" and other related terms are intended to encompass other machining processes removing matter from a workpiece, such as trepanning, cutting, etc.

A tripod base 24 is received on top of the base 12 and rigidly connected thereto. Three legs 22 extend from the tripod base 24 and support the worktable 16. The legs 22 extend radially from the worktable 16 in a regulary angularly spaced apart manner. Each leg 22 is connected to the tripod base 24 through a revolute joint 26 having an axis of rotation perpendicular to the leg 22. Each leg 22 also includes a high speed linear motor drive 28 comprising a strut base 30 which is slidable under the action of a high speed linear motor (not shown). A strut 32, preferably made of carbon fibre, is rigidly connected to each strut base 30 at one end and connected at another end to the worktable 16 through a spherical joint 34. Actuation of each linear motor drive 28 varies the length of the corresponding leg 22 and causes movement of the worktable 16. This configuration allows the worktable 16 to be moveable along three degrees of freedom, namely a translation Tz along the vertical direction, a rotation Ry about a horizontal axis Ay and a rotation Rx about a horizontal axis Ax perpendicular to the axis Ay.

The body 14 includes four identical vertical pillars disposed in a rectangular pattern about the worktable 16. Two y-axis high speed linear motor drives 40 extend horizontally in a parallel manner, each one being connected to two of the pillars. Each of the y-axis linear motor drives 40 receives an interfacing platform 42 which is slidable under the action of a high speed linear motor (not shown) to produce a translation Ty. A controller (not shown) provides motion synchronization between the two y-axis linear motor drives 40 such that the two interfacing platforms 42 move as a single unit An x-axis high speed linear motor drive 44 is rigidly connected to the two interfacing platforms 42 such as to extend perpendicularly to the y-axis linear motor drives 40. The x-axis linear motor drive 44 receives a laser head 36 of the laser assembly 20 which is slidable under the action of a high speed linear motor (not shown) to produce a translation Tx. A laser focusing lens 38 extends downwards from the laser head 36 over the worktable 16. This configuration allows the laser assembly 20 to be movable along two degrees of freedom, namely the perpendicular translations Tx and Ty, which are both perpendicular to the translation Tz.

Thus, the drilling machine 10 provides five degree-of-freedom relative positioning between the laser head 36 and the workpiece 18 on the worktable 16, i.e. three perpendicular translations, Tx, Ty and Tz, and two rotations about perpendicular axes, Rx and Ry. The configuration of the drilling machine 10, particularly the parallel kinematics structure formed by the legs 22, tripod base 24 and worktable 16, provides great motion flexibility and low load capacity on the axes of the linear motor drives 28, 40, 44. The two y-axis linear motor drives 40 provide a better accuracy and stabilize the support of the high moving mass of the laser assembly 20. Preferably, the tripod geometrical features are reconfigurable to provide the motion flexibility required by the products. The revolute joints 26 and/or the spherical joints 34 can be displaced during setup time to obtain the desired geometry. A high sampling rate real-time open arehitecture controller controls the linear motor drives 28,40,44 to obtain the desired five degree-of-freedom motion through an inverse kinematic model and synchronizes the relative movement between the workpiece 18 on the worktable 16 and the laser head 36 with the laser pulse frequency.

In use, the laser head 36 produces laser pulse having a preferable frequency of at least 4 Hz, more preferably between 10 Hz and 20 Hz. A number of desired hole locations and hole angles are programmed into the controller. The controller directs the linear motor drives 28,40,44 to move the worktable 16 and laser head 36 to successively align the desired hole locations with the pulsed laser beam at the desired angle, while coordinating the movement with the laser frequency such as to move the worktable 16 and laser head 36 during the time between consecutive pulses. In other words, after a hole is drilled, the next desired hole location is aligned with the laser head 36 at the desired angle before the laser head 36 produces a next laser pulse.

Figure 2:
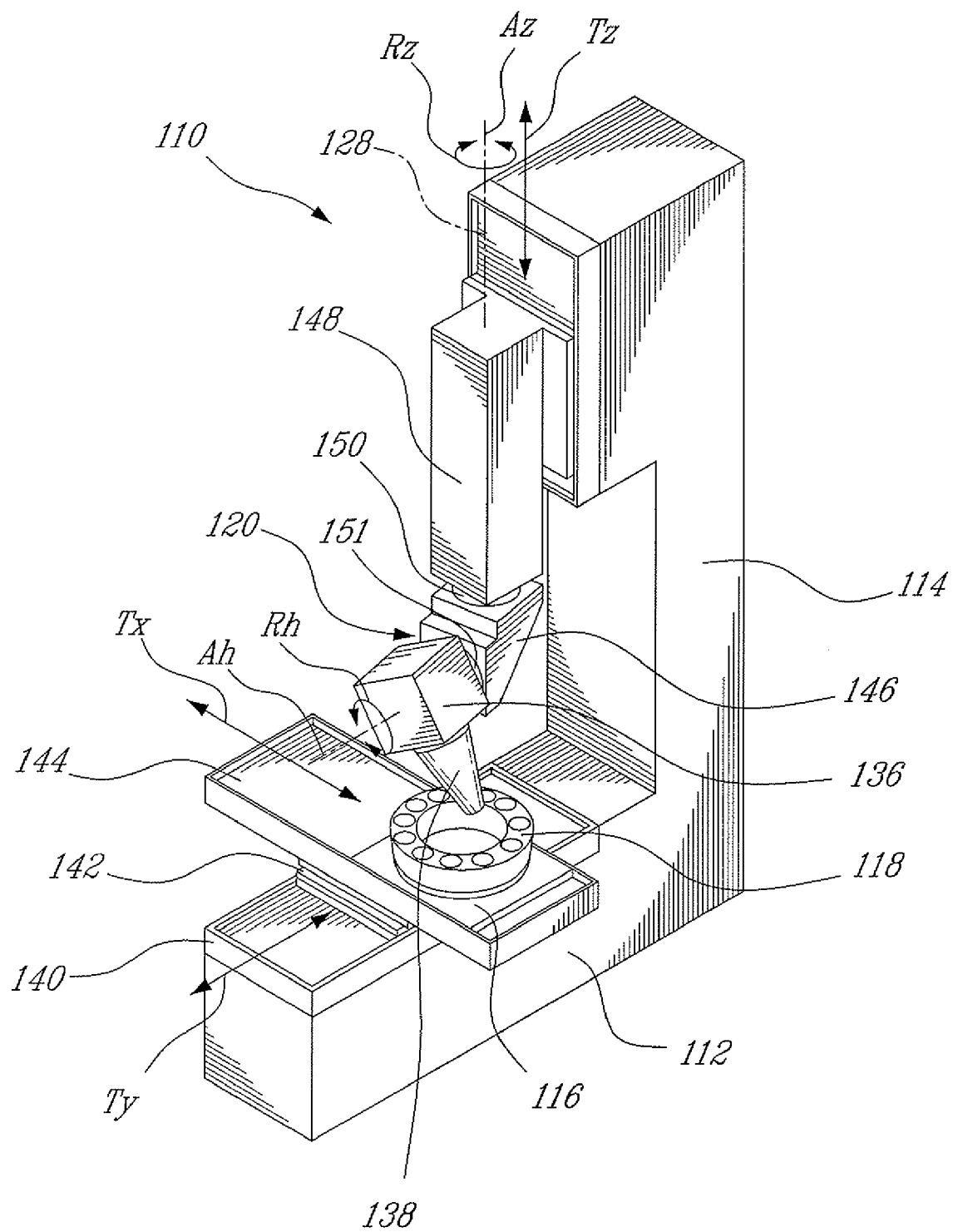
FIG. 2 is a perspective view of a drilling machine according to another embodiment of the present invention.

FIG. 2 illustrates another embodiment of a high speed drilling machine 110 including a fixed base 112, a body 114 supported thereon, a worktable 116 movably connected to the base 112 and receiving a workpiece 118, and a laser assembly 120 movably connected to the body 114 and located above the worktable 116.

The base 114 includes an horizontal y-axis high speed linear motor drive 140 receiving an interfacing platform 142 which is slidable under the action of a high speed linear motor (not shown) to produce a translation Ty. The interfacing platform 142 is rigidly connected to an horizontal x-axis high speed linear motor drive 144 extending perpendicularly to the y-axis linear motor drive 140. The x-axis linear motor drive 144 receives the worktable 116 which is slidable under the action of a high speed linear motor (not shown) to produce a translation Tx. This configuration allows the worktable 116 to be moveable along two degrees of freedom, namely perpendicular horizontal translations Tx and Ty.

The body 14 is shaped as an inverted L extending from the base 116. The top portion of the L receives a vertical z-axis high speed linear motor drive 128 extending perpendicularly to the x-axis and y-axis linear motor drives 140,144. A laser cavity 148 of the laser assembly 120 is received in the linear motor drive 128 to be slidable under the action of a high speed linear motor (not shown) to produce a translation Tz. A first rotary portion 146 is connected at the bottom of the laser cavity 148 through a first high angular acceleration direct drive 150 having an axis of rotation Az parallel to the translation Tz. A laser head 136 is connected to a side of the rotary portion 146 through a second high angular acceleration direct drive 151 having an axis of rotation Ah perpendicular to the axis of rotation Az. A laser focusing lens 138 extends downwards from the laser head 136 over the worktable 116. The rotary portion 146 and laser head 136 have a minimal moment of inertial and each include mirrors such that the laser beam coming from the laser cavity 148 can reach the laser focusing lens 138. This configuration allows the laser head 136 to be movable along three degrees of freedom, namely the translation Tz, a rotation Rz about the axis Az and a rotation Rh about the axis Ah.

Thus, the drilling machine 110 provides five degree-of-freedom relative positioning between the laser head 136 and the workpiece 118 on the worktable 116, i.e. three perpendicular translations, Tx, Ty and Tz, and two rotations about perpendicular axes, Rz and Rh. No inverse kinematic model is required for this layout since the required motion of the motor drives 128,140,144,150,151 is directly transformed from the coordinates of the desired hole angles by appropriate control means.

Figure 3:
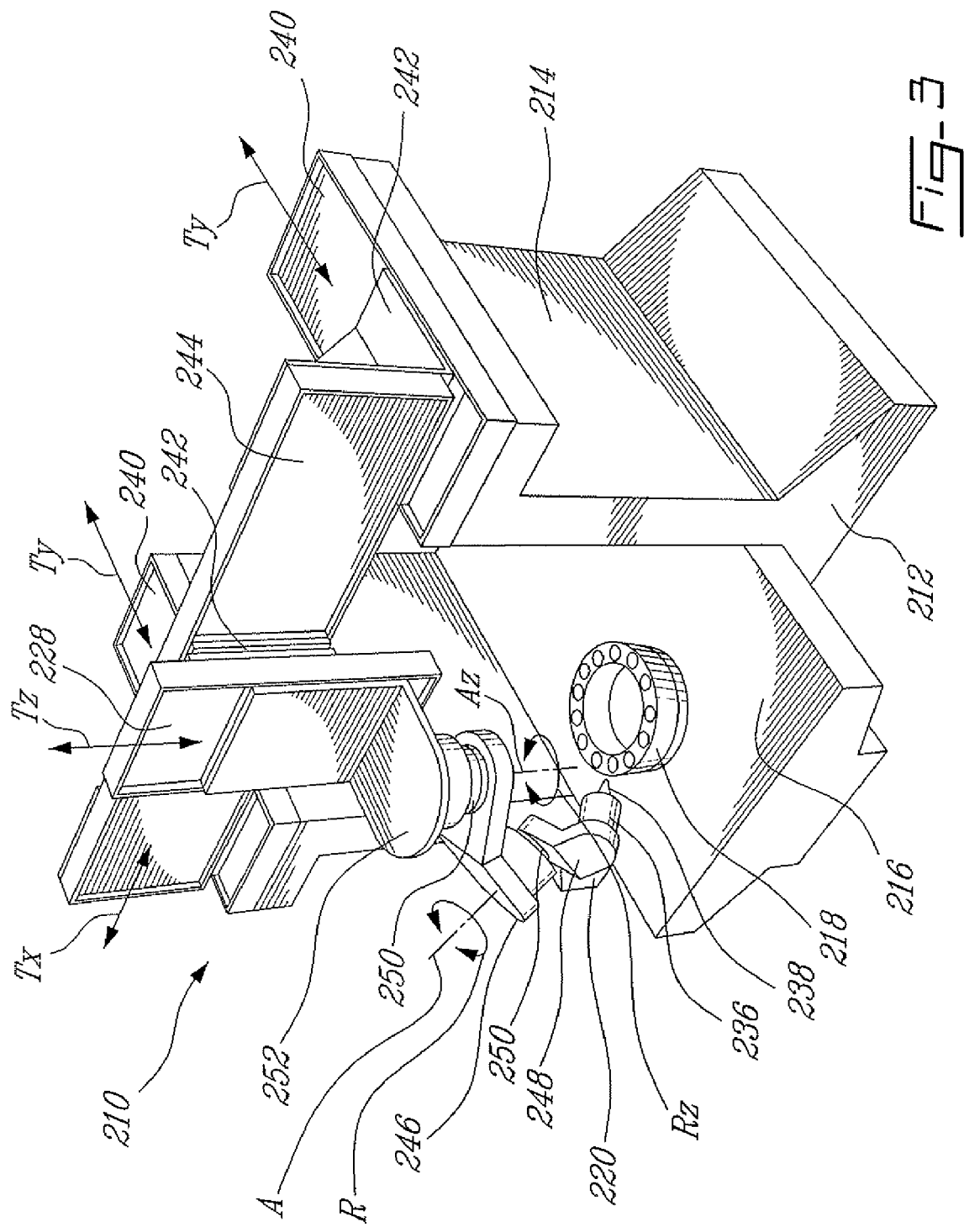
FIG. 3 is a perspective view of a drilling machine according to a further embodiment of the present invention.

FIG. 3 illustrates a further embodiment of a high speed drilling machine 210 including a fixed base 212, a body 214 connected thereto, a worktable 216 integral with the base 212 and receiving a workpiece 218, and a laser assembly 220 movably connected to the body 214 and located above the worktable 216. In this embodiment, the worktable 216 is fixed and the laser assembly 220 provides the five degree-of-freedom movement.

The body 214 includes two vertical pillars extending with the worktable 216 therebetween. Two y-axis high speed linear motor drives 240 extend horizontally in a parallel manner, one on top of each pillar. Each of the y-axis linear motor drives 240 receives an interfacing platform 242 which is slidable under the action of a high speed linear motor (not shown) to produce a translation Ty. A controller (not shown) provides motion synchronization between the two y-axis linear motor drives 240 such that the two interfacing platforms 242 move as a single unit. An x-axis high speed linear motor drive 244 is connected to the two interfacing platforms 242 such as to extend perpendicularly to the y-axis linear motor drives 240. The x-axis linear motor drive 244 receives another interfacing platform 243 which is slidable under the action of a high speed linear motor (not shown) to produce a translation Tx. A z-axis high speed linear motor drive 228 is rigidly connected to the interfacing platform 243 such as to extend perpendicularly to the x-axis and y-axis linear motor drives 240,244. A laser support 252 is received in the z-axis linear motor drive 228 and is slidable under the action of a high speed linear motor (not shown) to produce a translation Tz. A first rotary portion 246 is connected at the bottom of the laser support 252 through a first angular acceleration direct drive 250 having an axis of rotation Az parallel to the translation Tz. A second rotary portion 247 is connected to the first rotary portion 246 through a second high angular acceleration direct drive 251 having an axis of rotation Ar extending at an angle from the axis of rotation Az, a preferred angle being 45 degrees. A laser head 236 is rigidly connected to the second rotary portion 247, with a laser focusing lens 238 extending from the laser head 236. The laser focusing lens 238 forms a complementary angle with the axis of rotation Ar such that it is possible to bring the focusing lens 238 parallel to the axis of rotation Az, a preferred complementary angle being 45 degrees.

This configuration allows the laser head 236 to be movable along five degrees of freedom, for five degree-of-freedom relative positioning between the laser head 236 and the workpiece 218 on the worktable 216, i.e. three perpendicular translations, Tx, Ty and Tz, a rotation Rz about the axis Az and a rotation Rr about the axis Ar. Moreover, this configuration reduces the amount of translation necessary to compensate for any offset due to the rotations. The two y-axis linear motor drives 240 provide a better accuracy and stabilize the support of the high moving mass of the laser assembly 220.

In all embodiments, high resolution linear feedback encoders, preferably with a resolution of 0.00004 inch, are provided for the purpose of accurate positioning. The motor drives 28,40,44/ 128,140,144,150,151/ 228,240,244,250,251 are preferably cog free brushless DC servomotors, more preferably IntraDyn drives manufactured by Bosh Rexroth, but can be any other motor drives capable of sufficient speeds and accelerations. The linear motor drives 28,40,44/ 128,140, 144/ 228,240,244 can advantageously provide for 10 g acceleration with a maximum speed of 5 m/s. The angular motor drives 150,151/ 250,251 can advantageously provide for an angular acceleration of 500 rad/s2 with a peak angular speed of 1200 rpm. Such high speed and high acceleration capabilities enable the relative positioning between the laser head 36,136,236 and the worktable 16,116,216 to happen on a rate that matches the frequency of the pulsed laser, e.g. preferably at east 4 Hz, more preferably 10 to 20 Hz.

In use, the laser head 36,136,236 produces a laser pulse at a given frequency, in a continual manner. A relative movement between the laser head 36,136,236 and the workpiece 18,118,218 is produced by moving the laser head 36,136,236 and/or the worktable 16,116,216. Each of the desired hole locations of the workpiece 18,118,218 is successively aligned with the laser head 36,136,236 such that a hole can be drilled. The relative movement between the workpiece 18,118,218 and the laser head 36,136,236 is coordinated so that the time elapsed between the alignment of consecutive desired hole locations with the laser head 36,136,236 is less than or equal to the time between the firing of two consecutive pulses, e.g. the positioning is done in at most 0.1 s for a laser frequency of 10 Hz.

The laser shutter is not closed during the relative movement between the workpiece 18,118,218 and the laser head 36,136, 236, since the positioning is done in between consecutive pulses. Thus, a laser pulse frequency of 10 Hz represents a drilling rate of 600 holes per minute for holes requiring only one laser pulse to be completed, which can represent up to a 20 fold increase in drilling rate when compared with prior drilling machines driven by ball screws. The laser drilling machine 10,110,210 can improve the productivity of laser drilling operations of combustion chambers, combustion chamber liners, and other workpieces necessitating a high number of holes, by minimizing the time wasted in non-drilling tasks such as positioning of the workpiece 18,118 and/or the laser head 36,136,236 while eliminating the need to open and close the laser shutter.

The relative movement with five degrees of freedom between the laser head 36,136,236 and the workpiece 18,118, 218, including the two rotations of the laser head 136,236 or workpiece 36, allows the relative movement between the workpiece 18,118,218 and the laser head 36,136,236 to be done along an irregular pattern, i.e. with numerous changes of direction, such that the drilling machine 10,110,210 can effectively drill holes that are irregularly distributed (i.e. with variable distances between adjacent holes), as well as drill holes in workpieces which are not axisymmetric. The variable speed of the relative movement between the laser head 36,136,236 and the workpiece 18,118,218 allows the positioning to be done between two consecutive pulses even when the holes are distributed along an irregular pattern.

Also, the two rotations of the laser head 136,236 or workpiece 36 allow the drilling machine 10,110,210 to drill successive holes having different hole angles, as well as to drill holes having a composite angle.

The coordinated movement of both the laser head 36,136 and the workpiece 18,118 allows for faster and easier relative positioning from one hole location to the next.

The above description is meant to be exemplary only, and one skilled in the art will recognize that changes may be made to the embodiments described without department from the scope of the invention disclosed. For example, the drilling machine 10,110,210 can be used with other types of workpieces requiring a high number of holes, of any shape, and of any material appropriate for laser drilling. The invention is also intended to encompass other drilling processes using a pulsing drilling medium. Still other modifications which fall within the scope of the present invention will be apparent to those skilled in the art, in light of a review of this disclosure, and such modifications are intended to fall within the appended claims.

What is claimed is:

1. A method of laser drilling a plurality of holes at spaced-apart hole locations in a workpiece, comprising the steps of continually delivering laser pulses at a given laser pulse frequency from a laser head to the workpiece while keeping a shutter of the laser head open, and moving both the laser head and the workpiece to re-position the workpiece along multiple axes relative to the laser head from one hole location to a next hole location so as to produce a relative movement between the laser head and the workpiece having at least five degrees of freedom, wherein the multi-axis repositioning occurs within a time less than a time between two consecutive laser pulses.

2. The method as defined in claim 1, wherein the given laser pulse frequency is at least 4 Hz.

3. The method as defined in claim 1, wherein the hole locations are irregularly distributed on the workpiece.

4. The method as defined in claim 1, wherein the plurality of holes includes holes having different angles relative to one another.

5. The method as defined in claim 1, wherein at least one of the laser head and the workpiece moves with a variable speed.

6. A method for laser drilling a plurality of holes into a workpiece, the method comprising:
   producing laser pulses at a given frequency with a laser head;
   successively moving both the workpiece and the laser head in multiple-axis movement to a series of relative positions with at least one of a variable speed and an irregular pattern, wherein said multi-axis movement between consecutive relative positions occurs in a time no greater than a time between two consecutive ones of the laser pulses; and
   drilling a hole in the workpiece at each one of the series of relative positions with at least one of the laser pulses.

7. The method as defined in claim 6, wherein the moving of the laser head and the workpiece is done so as to produce a relative movement between the laser head and the workpiece having five degrees of freedom.

8. The method as defined in claim 6, wherein the given laser pulse frequency is at least 4 Hz.

9. A method for laser drilling a plurality of holes into a workpiece, the method comprising:
   producing a pulsed laser beam with a laser head, the pulsed laser beam having a given pulse frequency;
   successively aligning each of a plurality of desired hole locations with the pulsed laser beam through variable speed 5-axis relative movement between the workpiece and the laser head, the workpiece and the laser head both moving to provide said variable speed 5-axis relative movement; and
   drilling a hole at each of the desired hole locations by synchronizing the variable speed, 5-axis relative movement with the laser pulse frequency so as to position the workpiece relative to the laser head from one hole location to a next hole location within a time less than a time between two consecutive laser pulses.

10. The method as defined in claim 9, wherein the step of aligning each of the hole locations is done concurrently with a step of setting a desired hole angle for each of the hole locations through the relative movement between the workpiece and the laser head, and the step of drilling the hole at each of the desired hole locations is done along the desired hole angle, the desired hole angle for at least one of the desired hole locations being different from the desired hole angle at another one of the desired hole locations.

11. The method as defined in claim 9, wherein the desired hole locations are distributed on the workpiece along an irregular pattern.

12. The method as defined in claim 9, wherein the relative movement has a variable speed.

13. The method as defined in claim 9, wherein the axes of rotation are perpendicular.

14. The method as defined in claim 9, wherein the laser pulse frequency is at least 4 Hz.

15. A high speed laser drilling machine for drilling a hole in each of a plurality of desired holes locations of a workpiece, the high speed drilling machine comprising:
   a laser head producing uninterrupted laser pulses at a frequency of at least 4 Hz;
   a worktable adapted to retain the workpiece;
   means for moving both the worktable and the laser head to produce a relative movement between the worktable and the laser head along five degrees of freedom, the means for moving successively aligning the laser head with each of the hole locations, at a desired hole angle, during a time less than a time between two consecutive laser pulses, the means for moving including first and second means for translating the worktable along first and second perpendicular directions, third means for translating the laser head along a third direction perpendicular to the first and second direction, first means for rotating the laser head about a first axis parallel to the third direction, and second means for rotating the laser head about a second axis perpendicular to the first axis; and
   means for controlling the means for moving to synchronize the five degrees of freedom relative movement with the uninterrupted laser pulses so that each laser pulse drills a hole in the workpiece at one of said hole locations and at the desired hole angle.

16. The high speed laser drilling machine as defined in claim 15, wherein the means for moving include a plurality of high speed, high acceleration linear motors.

17. The high speed laser drilling machine as defined in claim 15, wherein the means for moving include first means for displacing the worktable with two rotations about first and second perpendicular axes and one translation along a first direction perpendicular to the first and second axes.

18. A high speed drilling machine comprising for drilling a plurality of holes in a workpiece, the high speed drilling machine comprising:
   a worktable adapted to receive the workpiece;
   a fixed base and a body extending therefrom;
   at least three legs connecting the worktable to the fixed base, each of the legs having a high speed linear actuator such as to have a variable length, the legs moving the worktable along at least three degrees of freedom;
   a laser head connected to the body and producing uninterrupted laser pulses at a predetermined frequency to drill a plurality of holes in the workpiece; and wherein each of said high speed linear actuators provides positioning feedback to a controller configured to synchronize the variable speed movement with the laser pulses so as to position the workpiece relative to laser head from one hole location to a next hole location within a time between two consecutive pulses.

19. The high speed drilling machine according to claim 18, wherein the laser head is connected to the body through perpendicular high speed linear actuators moving the laser head to produce first and second perpendicular translations.

20. A high speed drilling machine for drilling a plurality of holes in a workpiece, the high speed drilling machine comprising:
   a fixed base and a body extending therefrom;
   a worktable connected to the fixed base and adapted to receive the workpiece;
   a first laser portion connected to the body through at least a first high speed linear actuator to be translatable along at least a first direction;

a second laser portion connected to the first laser portion through a first high angular acceleration rotational drive to be rotatable about a first axis;

a pulsed laser head connected to the second laser portion through a second high angular acceleration rotational drive to be rotatable about a second axis, the laser head producing laser pulses in a constant manner to drill a plurality of holes in the workpiece; and a controller receiving position feedback from said first high speed linear actuator and said first and second high angular acceleration rotational drives for synchronizing the movement with the laser pulse so as to position the workpiece relative to the laser head from one hole location to a next hole location within a time between two consecutive pulses while keeping a shutter of the laser head open.

21. The high speed drilling machine according to claim 20, wherein the worktable is connected to the base through second and third perpendicular high speed linear actuators to be translatable along second and third perpendicular directions, the second and third directions being perpendicular to the first direction.

22. The high speed drilling machine according to claim 20, wherein the first and second axes are perpendicular.

23. The high speed drilling machine according to claim 20, wherein the first laser portion is connected to the body also through second and third perpendicular high speed linear actuators to be translatable along second and third perpendicular directions, the second and third directions being perpendicular to the first direction.

* * * * *